United States Patent Office 2,771,354
Patented Nov. 20, 1956

2,771,354
CONCENTRATION OF IRON ORES

Olav Moklebust, Hauge (Dalane), and Assur Gjessing Oppegaard, Fredrikstad, Norway, assignors to National Lead Company, New York, N. Y., a corporation of New Jersey No Drawing. Application June 1, 1953,
Serial No. 358,982

1 Claim. (Cl. 75—33)

This invention relates to reduction of oxidic iron ores particularly to the taconite and hematite types. More particularly, it relates to a process for efficient low temperature partial reduction of the iron content of said ores to permit subsequent separation of iron values from impurities and gangue.

In U. S. Patent No. 2,523,138 there is described a method for partial reduction of iron ores by admixing comminuted ore with a carbonaceous reducing agent and furnacing at temperatures between 800° C. and 1000° C. After partial reduction, magnetic separation is employed to separate iron values from gangue and impurities. In the operation of such a process, the danger of sintering, when the charge is furnaced in a rotary kiln, has necessitated temperatures of 900° C. or lower when treating fractions of the ore of relatively fine particle size. Such low temperatures have resulted in difficulty in obtaining the maximum degree of reduction in a normal furnacing time.

It is therefore the object of this invention to provide an improved method for partial reduction of oxidic iron ores. Another object of this invention is to provide a method for partial reduction of iron ores which will produce a higher percentage of the iron values in metallic state. Another object of the invention is to provide a method for treatment of iron ores to provide improved efficiency in the recovery of iron values from such ores.

This invention contemplates first comminuting iron ore of the taconite or hematite type to produce a plurality of fractions. The ore may be crushed by conventional means and the crushed ore screened to produce fractions preferably as follows:

Plus 15 mm. (minus 30–50 mm.)
Minus 15 mm. plus 3 mm.
Minus 3 mm.

The upper limit of particle size of the largest fraction is not critical but particles over about 50 mm. size should be returned to the grinding circuit for recrushing. The finest fraction is then treated to remove the dust or slime material, that is particles of a size less than about 80 mesh. This may be accomplished by washing the ore, preferably by treatment in a wet classifying device of conventional construction adapted and operated to separate the less than about 80 mesh material from the remainder of this fraction.

The three fractions are then treated with a carbonaceous reducing agent during separate furnacing at the following temperatures:

| | |
|---|---|
| Plus 15 mm | 1000° C. to 1100° C. |
| Plus 3 mm. minus 15 mm | 975° C. to 1075° C. |
| Minus 3 mm | 950° C. to 1050° C. |

The reduction may be carried out in a rotary kiln and is continued until each of the fractions shows a reduction of 70% to 80% of its iron oxide content to metallic iron. Magnetic separation is then employed to separate the partially reduced iron values from gangue and other impurities.

In the case of taconite type ores the dust or slime separated from the fine (minus 3 mm.) fraction will generally be found to contain mostly gangue. The percentage of iron will be such that recovery of iron values will not be warranted. In the case of hematite, however, the dust or slime will contain a substantial proportion of iron and can therefore be treated too for recovery of this constituent. When employing hematite type ore treatment of the fine fraction may be modified to provide a conveniently recoverable slime portion by first pugging the minus 3 mm. material with about 50% to 60% of its weight of water to form a heavy thick pulp. The pulp is then settled by jigging or shaking or otherwise treated according to known gravity methods to separate the heavier solid material at the botom leaving the slime fraction (minus about 80 mesh) as the fines suspended in the heavy pulp. The settled solids are separated from the supernatant pulp, preferably washed, and then furnaced as hereinbefore described. The pulp is dewatered, as for instance by filtering, to produce a filter cake. This filter cake is then formed into discrete lumps such as pellets or nodules, advantageously by extrusion, which will be found to contain up to about 50% Fe in the form of iron oxide. The so-formed lumps, pellets or nodules are preferably baked at a temperature of 900°–1000° C. which dries and transforms them into very hard masses which can readily be transported and handled without breakage. They provide in this form an excellent blast furnace feed material.

To further illustrate the practice of this invention, the following examples are shown:

Example 1

A charge of taconite type iron ore containing 32% Fe in the form of iron oxide was crushed to less than 50 mm. size. The crushed material was then screened to produce three fractions as follows:

Plus 15 mm.
Plus 3 mm. minus 15 mm.
Minus 3 mm.

The minus 3 mm. fraction was then washed by treating with water and passing the pulp through a wet classifier adjusted to separate fine particles of less than about 80 mesh size. The overflow containing the fines was discarded.

The three fractions, that is the plus 15, the plus 3 minus 15 and the washed minus 3 mm. were then furnaced separately in a rotary kiln in the presence of a carbonaceous reducing agent at the following temperatures:

| | °C. |
|---|---|
| Plus 15 mm | 1050 |
| Plus 3 minus 15 mm | 1025 |
| Minus 3 mm | 1000 |

Reduction in each case was carried on until the following percentages of the iron content in each fraction had been reduced to metallic iron:

| | Percent |
|---|---|
| Plus 15 mm | 70 |
| Plus 3 minus 15 mm | 75 |
| Minus 3 mm | 80 |

The reduced fractions were then combined, crushed to minus 1 mm. size and subjected to magnetic separation. The magnetic separation produced a concentrate containing 59% metallic Fe and 79% total Fe, representing a recovery of 81% of the iron in the original ore. The concentrate was briquetted to form a feed material suitable for complete reduction to pig iron in a blast furnace.

Example 2

A charge of iron ore of the hematite type containing 48% Fe was crushed and screened into similar sized fractions as the ore of Example 1. The finest fraction, that is less than 3 mm. was pugged with 55% water and the heavy mixture jigged to settle the heavier solids. The solids were then separated from the pulp which contained the material finer than about 80 mesh in suspension and washed. These solids were then furnaced together with the larger fractions separately under the same conditions as in Example 1, followed by crushing and magnetic separation to produce an iron concentrate, containing 66% metallic Fe and 88% total Fe, which was briquetted. The pulp separated from the minus 3 mm. fraction was filtered on a rotary filter producing a filter cake containing 25% water. This cake was extruded into pellets about two inches in diameter which were baked at 920° C. for two hours. The baked briquettes were hard and contained 49% Fe in the form of $Fe_2O_3$. They were combined with the briquettes obtained from reduction of the ore fractions to from a combined concentrate, suitable for blast furnace feed which represented a recovery of over 90% of the iron in the original ore.

The temperatures employed during the furnacing of the ore fractions are important and critical. Operation above the temperature limits stated will entail danger from sintering in the charge while lower temperatures will not produce economical furnacing operations. Under the conditions stated, efficient and rapid reduction is obtained without furnacing difficulties.

While this invention has been described and illustrated by the embodiments and examples shown, it is not intended to be strictly limited thereto and other modifications and variations may be employed within the scope of the following claim:

We claim:

In a process wherein iron ore selected from the types consisting of taconite and hematite is partially reduced by heating at a comparatively low temperature in the presence of a carbonaceous reducing agent and subsequently subjected to magnetic separation to produce an iron concentrate, the steps which comprise crushing said ore to a particle size less than about 50 millimeters, screening said crushed ore to produce a plurality of fine and coarse fractions, removing from the finest fraction by means of a wet classification operation material of less than about 80 mesh particle size, and furnacing said fractions separately in the presence of a carbonaceous reducing agent at temperatures between 950° C. and 1100° C., employing lower temperatures in the lower part of this range for the finest fractions, the less than about 80 mesh material removed from the finest fraction of crushed ore being dewatered, formed into discrete lumps, the lumps baked at a temperature between 900° C. and 1000° C., and the baked lumps being added to the iron concentrate obtained from treatment of the remaining ore fractions.

References Cited in the file of this patent

UNITED STATES PATENTS

| | | |
|---|---|---|
| 2,108,043 | Crist | Feb. 15, 1938 |
| 2,523,138 | Oppegaard | Sept. 19, 1950 |